INVENTOR
ALPHONSE P. RUFFING

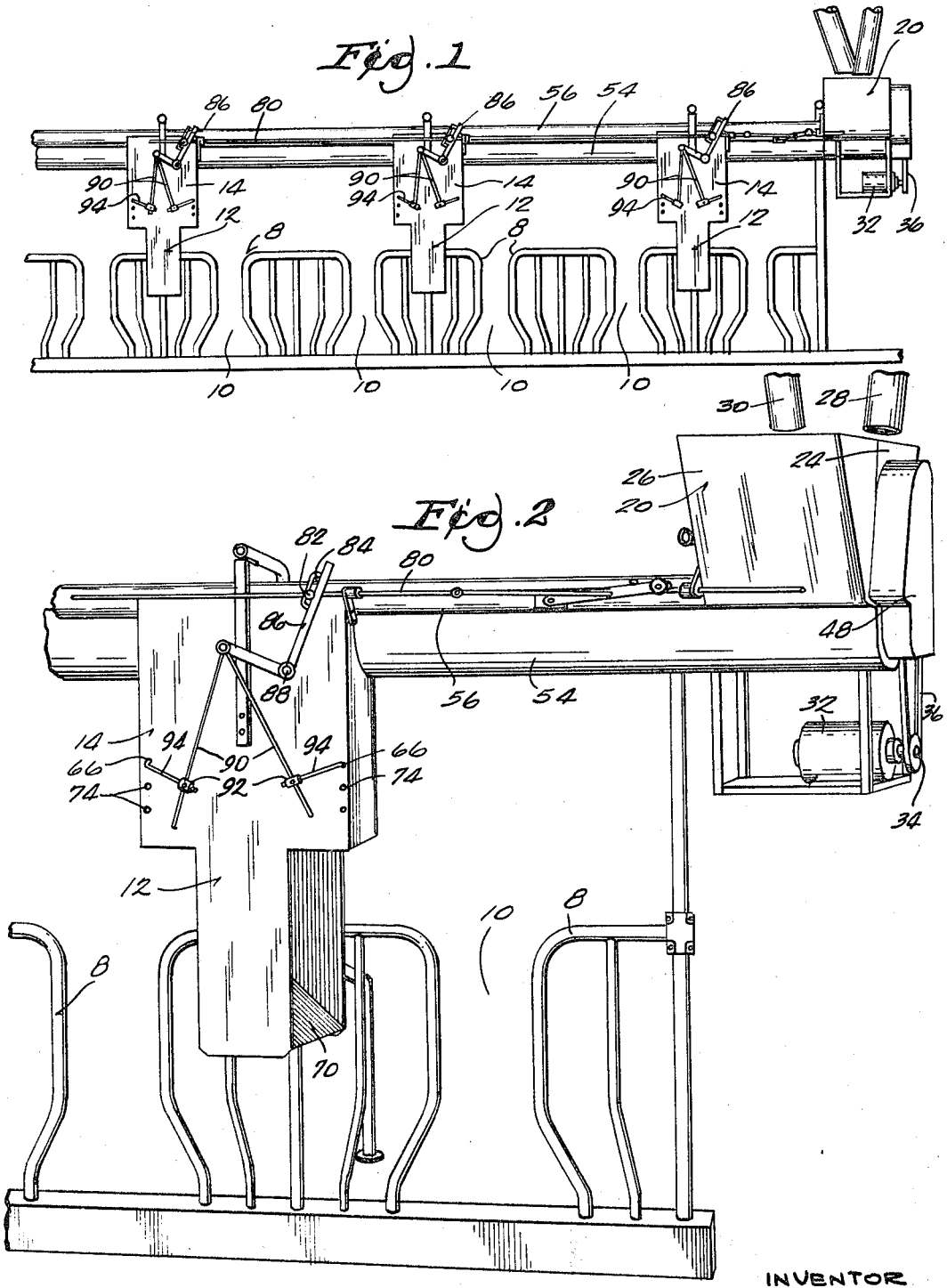

BY Wheeler, Wheeler, House & Clemency
ATTORNEYS

Jan. 21, 1969  A. P. RUFFING  3,422,799
CATTLE FEEDING SYSTEM
Filed Aug. 15, 1966  Sheet 3 of 3
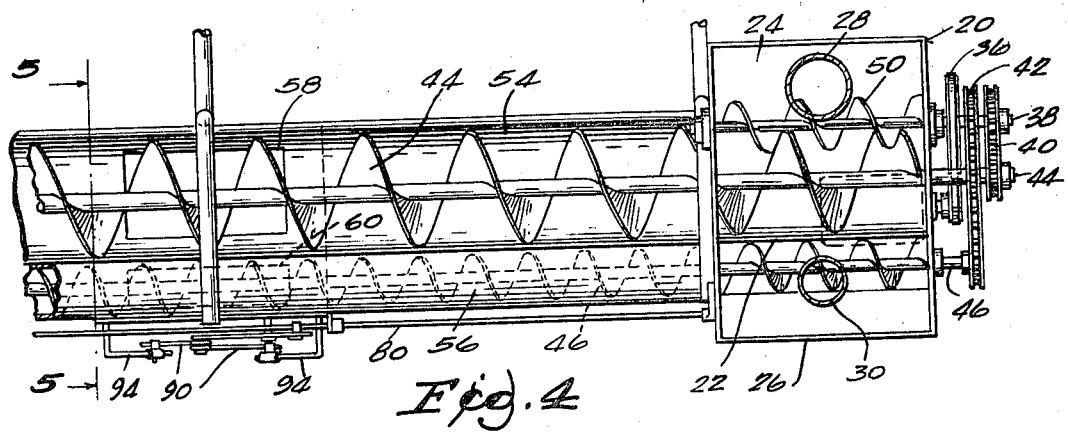
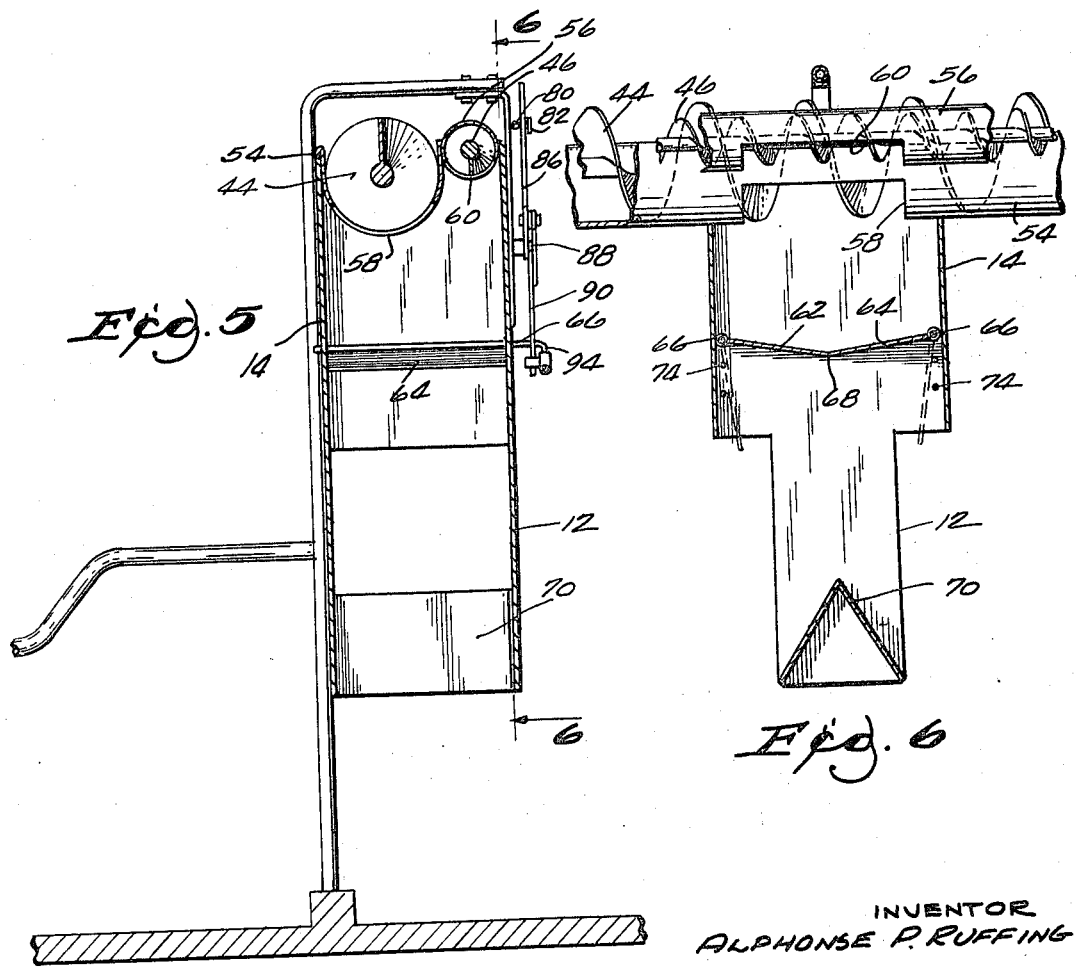
INVENTOR
ALPHONSE P. RUFFING
Wheeler, Wheeler, House & Clemency
ATTORNEYS

United States Patent Office 3,422,799
Patented Jan. 21, 1969

3,422,799
CATTLE FEEDING SYSTEM
Alphonse P. Ruffing, Marshfield, Wis., assignor to Berg Equipment Corporation, Marshfield, Wis., a corporation of Wisconsin
Filed Aug. 15, 1966, Ser. No. 572,515
U.S. Cl. 119—56
Int. Cl. A01k 5/02
6 Claims

ABSTRACT OF THE DISCLOSURE

Parallel feed screws operate at different speeds to deliver different feeds from a partitioned supply hopper across a series of storage and delivery hoppers, each of which serves two stalls and each of which has control gates which hold the delivered material in the respective delivery hoppers until all have been supplied.

---

The screw conveyor troughs have bottom openings communicating with the respective delivery hoppers so that the feed will discharge into each successive delivery hopper until that hopper is filled, whereupon the trough will deliver feed beyond the full hopper and into the next empty one.

When all hoppers are filled and the motor driving the screw conveyors is shut off, the operator can manipulate a single control which will dump all of the delivery hoppers concurrently. Thus all the animals get food at the same moment. Each delivery hopper has baffles for directing approximately half of its contents to the left and half to the right for the two animals served from each respective hopper. The baffles are at right angles to the feed screw axes so that each animal will get half of the material delivered by each screw.

BACKGROUND OF THE INVENTION

It is desirable that certain feeds shall not be mixed in advance. For example, silage is usually quite wet whereas ground feed should be kept dry because it might otherwise cake in the said trough. In the past, some special operation of mixing or separate adding has been required. In the instant device, the two feeds are kept entirely separate up to the point where they enter the delivery hoppers, from which they are dumped almost immediately. It is also advantageous to have the delivery screws operated at different speeds according to the materials to be delivered. Because the speed of operation of the screw handling the ground feed is fairly high, the trough in which this feed screw operates is covered, whereas the other may be open.

It is believed that there is also novelty in having the respective troughs open at their bottoms where they cross the delivery hoppers. Cattle that require different quantities of feed can be accommodated by varying the capacities of respective hoppers by moving up and down in the delivery hoppers the dump valves which control discharge therefrom.

DESCRIPTION OF THE INVENTION

FIG. 1 is a view in front elevation fragmentarily illustrating an installation embodying the invention.

FIG. 2 is an enlarged detail view in perspective showing the supply hopper and one of the delivery hoppers of the device illustrated in FIG. 1.

FIG. 4 is a plan view of the parts shown in FIGS. 2 and 3, the chain drive cover removed.

FIG. 5 is a view taken in section on the line 5—5 of FIG. 4.

FIG. 6 is a view taken in section on the line 6—6 of FIG. 5, portions being broken away.

Figure 3:
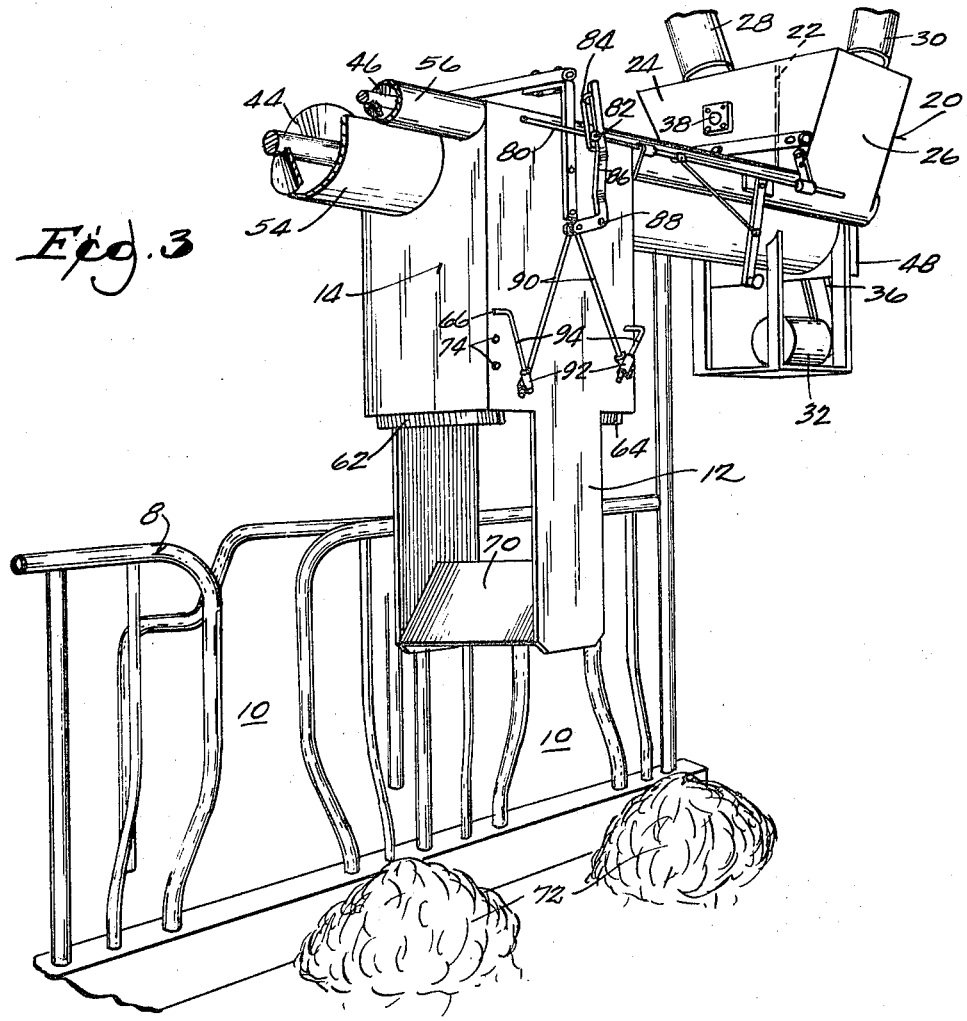
FIG. 3 is a view in perspective showing from the opposite side the parts which were illustrated in FIG. 2.
Figure 7:
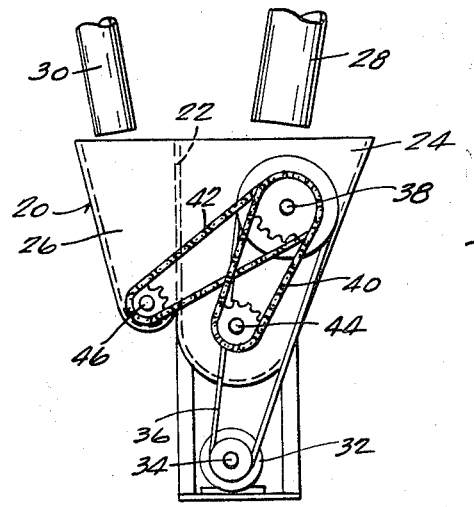
FIG. 7 is an end elevational view of the supply hopper and the feed screw drive mechanism as seen from the right in FIG. 4.

In FIG. 1 I have illustrated a conventional arrangement of aligned stanchions 8 having openings at 10 for the necks of animals in the several stalls. Between the stalls of successive pairs of stalls are feed chutes 12 opening downwardly from delivery hoppers 14 which are supplied with feeds from a supply hopper 20 which is desirably provided with a partition 22 dividing it into separate compartments 24 and 26 for different feeds delivered to it through spouts 28 and 30 respectively. For example, spout 28 may deliver silage and spout 30 a dry ground meal.

A motor 32 has its drive shaft 34 connected by chain or belt 36 with a jack shaft 38. From this jack shaft, chains (or other driving connections) 40 and 42 respectively transmit motion to feed screws 44 and 46. The driving connections are at least partially enclosed in a drive housing 48 as shown in FIG. 1 and FIG. 2. I may also use a mixer screw 50 on jack shaft 38 to mix and break up lumps in the material in the larger compartment 24 of the feed hopper.

The screw 44 is relatively large in diameter and disposed in an open feed trough 54. Usually the compartment 24 and the feed screw 44 will handle silage delivered to the compartment by the spout 28. In some installations, this may come directly from the silo. In others a different arrangement for supplying the spout will have to be provided. The feed screw 46 is smaller and operates in the closed trough 56. Usually this will handle ground feed of some kind.

The bottoms of the respective troughs 54 and 56 are provided with wide open slots 58 and 60 respectively communicating with each of the delivery hoppers 14. It will be observed in FIGS. 5 and 6 that the respective troughs 54 and 56 are, in effect, passing through the delivery hoppers 14 in the sense that the slot of each of them opens into the delivery hopper well below the top thereof. The capacity of each of the delivery hoppers is controllable to a substantial extent by the level of the dump gates 62 and 64, which are pivoted at opposite sides of the hopper and, in effect, constitute the bottom thereof. Each gate is connected with a pintle 66 and supported thereby in a nearly horizontal position in which the free margins 68 of the gates meet as shown in FIG. 6. As best shown in FIGS. 2 and 3, each delivery hopper has openings 74 at different levels to receive the pintles 66. Thus by simply disposing a given pintle at a particular level, the height of the feed supported above the pintle is regulated to vary the capacity of the particular feed hopper.

When the cattle served by any such delivery hopper are to be fed, the respective pintles are oscillated to drop the gates for delivery of the contents of the hopper into the spout 12. The spout has a divider baffle 70 which throws some of the feed to the right and some to the left to establish piles of food 72 for the respective cattle which are to be served by the delivery hopper.

It will be noted that the pintles 66 are at right angles to the axes of the feed screws 44 and 46. Thus the feed discharged through the respective openings 58 and 60 extends across both of the dump gates 62 and 64 instead of having one type of feed concentrated above one gate and the other type of feed concentrated above the other.

Because the openings 58 and 60 in the feed troughs are located well below the tops of the respective delivery hoppers 14, each delivery hopper in turn will be filled to the level of the feed screws before substantial volume of feed will be carried to the next delivery hopper.

The operator will continue to supply feed through the spouts 28 and 30 until shortly before all of the delivery hoppers have been filled. The feed remaining in the supply hopper and the troughs will normally be sufficient to complete the filling of the last several delivery hoppers. At this point, the operation of the motor 32 will be shut off and the screws will come to rest. Because the separate types of feed are segregated in the respective feed troughs, it is immaterial that some feed may remain in the troughs until the next feeding time.

It is disadvantageous to feed the cattle successively. An advantage of the organization disclosed is the ease with which all of the cattle may be fed simultaneously. A control rod 80 runs the whole length of the installation. Hence, it may be manipulated by the operator from wherever he happens to be when the several delivery hoppers have been filled. Projecting laterally from the control rod 80 are pegs 82 guided in slots 84 in each of several bell cranks 86, respectively pivoted at 88 on each of the delivery hoppers 14. Pivotally connected to the respective bell cranks are links 90 which are respectively pivoted to sleeves 92 adjustable on the arms 94 of the respective pintles 66. Thus when the operator shifts the control rod 80 to the left as viewed in FIG. 2, the contents of every delivery hopper throughout the whole series of stalls will be dumped simultaneously to provide the piles of feed 72 as shown in FIG. 3, one such pile being immediately adjacent the position of each of the animals to be fed.

I claim:

1. A cattle feeding system including a supply hopper having separate compartments for different feeds, a feed trough leading separately from each compartment, feed screws operable in the respective feed troughs, delivery means along said troughs defining separate stations whereby feed for animals to be fed is discharged, and means for delivering to the respective stations feed separately conveyed to said stations through the respective troughs, the delivery means comprising a delivery hopper at each station through which the troughs extend and the bottoms of the respective troughs are provided with an opening for the discharge of feed into said delivery hoppers, whereby the feeds are delivered separately from the respective troughs into said delivery hopper and commingled therein prior to delivery from the hoppers at respective stations into a feed area by the actuation of a dump means on said delivery hopper.

2. A cattle feeding system according to claim 1 in which said delivery hopper has a bottom comprising said dump means including at least one dump gate, and means for controlling the dumping of said gate.

3. A cattle feeding system according to claim 1 in which said delivery hopper includes said dump means which has two dump gates pivoted at opposite sides of the delivery hopper for oscillation between closed and open positions upon axes which are transverse to the axes of the feed screws.

4. A cattle feeding system including a supply hopper having separate compartments for different feeds, a feed trough leading separately from each compartment, feed screws operable in the respective feed troughs, delivery means along said troughs defining separate stations for animals to be fed, and means for delivering at the respective stations feed separately conveyed to said stations by the respective troughs, the delivery means comprising a delivery hopper at each station through which the troughs extend and the bottoms of the respective troughs are provided with openings, whereby the feeds are delivered separately from the respective troughs into said delivery hopper and commingled therein prior to delivery from the hoppers at respective stations, the delivery hopper having dump gates pivoted at opposite sides thereof for oscillation between closed and open positions upon axes which are transverse to the axes of the feed screws, said hopper further including supports at different levels for the pintles with which the dump gates are pivoted and which support the dump gates for pivotal movement to said open positions, the location of the gates on such pintles controlling the capacity of the delivery hopper.

5. A cattle feeding system comprising means establishing a row of feeding stations, a feed hopper having separate feed compartments, conveyor troughs opening individually from respective compartments and extending along the row of feeding stations, separate feed screws in the troughs, delivery hoppers at respective stations and through upper portions of which said troughs extend, the respective troughs being open at their bottoms into the respective delivery hoppers, dump gates constituting the bottoms of respective hoppers and movable between normally closed positions and open positions, and means for concurrently actuating the dump gates of a plurality of hoppers for the simultaneous delivery to a plurality of feeding stations of feed delivered into the hoppers from the respective troughs, the respective troughs being of different capacity and respective feed screws having means for actuating them at differing speeds, each delivery hopper comprising a plurality of dump gates movable between closed and delivery positions and having mounting pintles at opposite sides of the delivery hopper and disposed transversely of the axis of the feed screws, a control rod extending lengthwise of the system across a plurality of said stations, a bell crank at each station with which the control rod is connected and links connecting each bell crank with the pintles of dump gates of a delivery hopper.

6. A cattle feeding system according to claim 5 in which baffle means below the bottom of each delivery hopper constitutes means for dividing between adjacent feed stations the feed discharged from the delivery hopper when the dump gates are in delivery position.

References Cited

UNITED STATES PATENTS

| | | | |
|---|---|---|---|
| 849,169 | 4/1907 | Stein | 119—51.15 |
| 2,962,191 | 11/1960 | Moore. | |
| 3,037,671 | 6/1962 | Cochran | 222—142 |
| 3,125,991 | 3/1964 | Van Dusen | 119—56 |
| 3,185,230 | 5/1965 | Blough. | |

HUGH R. CHAMBLEE, Primary Examiner.

U.S. Cl. X.R.

222—142